US009797744B2

(12) United States Patent
Bethel

(10) Patent No.: US 9,797,744 B2
(45) Date of Patent: *Oct. 24, 2017

(54) ELECTRONIC FLIGHT DATA DISPLAY INSTRUMENT

(75) Inventor: Jeffrey D. Bethel, Albuquerque, NM (US)

(73) Assignee: Aspen Avionics, Inc., Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 13/337,942

(22) Filed: Dec. 27, 2011

(65) Prior Publication Data

US 2012/0098679 A1    Apr. 26, 2012

Related U.S. Application Data

(63) Continuation of application No. 11/773,419, filed on Jul. 4, 2007, now Pat. No. 8,085,168.

(60) Provisional application No. 60/884,255, filed on Jan. 10, 2007, provisional application No. 60/806,555, filed on Jul. 5, 2006, provisional application No. 60/869,868, filed on Dec. 13, 2006.

(51) Int. Cl.
G01C 21/00 (2006.01)
G01C 23/00 (2006.01)
B64D 43/00 (2006.01)

(52) U.S. Cl.
CPC ............. *G01C 23/00* (2013.01); *B64D 43/00* (2013.01)

(58) Field of Classification Search
USPC ....... 340/971, 945, 963, 973; 244/175, 75.1; 701/14
See application file for complete search history.

(56) References Cited

U.S. PATENT DOCUMENTS

| 4,913,383 | A | * | 4/1990 | Hill et al. | 248/27.1 |
| 5,396,425 | A | * | 3/1995 | Carlson | 701/14 |
| 5,758,297 | A | * | 5/1998 | Gaultier | 701/14 |

(Continued)

FOREIGN PATENT DOCUMENTS

WO    WO2007/086822    8/2007

OTHER PUBLICATIONS

Universal Avionics Systems Corporation website, EFI-890R, first publication date: Unknown; first accessed Feb. 2012

(Continued)

*Primary Examiner* — Travis Hunnings
(74) *Attorney, Agent, or Firm* — Kutak Rock LLP; Bryan P. Stanley

(57) ABSTRACT

An electronic display instrument configured to secure in a desired position over multiple pre-existing instrument holes in a dashboard of an aircraft in place of multiple conventional display instruments, each conventional instrument having a conventional readout. The instrument comprises a display screen having a plurality of readouts corresponding to the conventional readouts of the multiple conventional instruments that the electronic display instrument replaces. The instrument further includes a body having a front and a back opposite the front and a top and a bottom opposite the top. The body is positioned adjacent and connected to the display screen. The instrument also includes an electronics module protruding from the back of the body to position in one of the pre-existing instrument holes in the dashboard panel of the aircraft.

25 Claims, 4 Drawing Sheets

(56) References Cited

U.S. PATENT DOCUMENTS

| | | | | |
|---|---|---|---|---|
| 6,343,863 B1* | 2/2002 | Wood | ............................... | 353/13 |
| 7,254,744 B2* | 8/2007 | Dunstan et al. | ................. | 714/24 |
| 7,362,240 B2* | 4/2008 | Buell et al. | .................... | 340/945 |
| 7,420,476 B2* | 9/2008 | Stiffler | ........................... | 340/945 |
| 7,446,675 B2* | 11/2008 | Dutton | ........................... | 340/945 |
| 2006/0293804 A1* | 12/2006 | Bethel | ............................... | 701/4 |

OTHER PUBLICATIONS

Universal Avionics Systems Corporation brochure, EFI-890R, first publication date: Unknown; first accessed online Feb. 2012; copyright notice indicates at least some content was created in 2005; electronic metadata indicates that the file was created Mar. 2010.
"Flat-Panel Displays Are Here", Business and Commercial Aviation, vol. 75, No. 1 (Jul. 1, 1994), pp. 48-51.

* cited by examiner

ELECTRONIC FLIGHT DATA DISPLAY INSTRUMENT

CROSS-REFERENCE TO RELATED APPLICATIONS

This application is a continuation of U.S. application Ser. No. 11/773,419, filed Jul. 4, 2007, now U.S. Pat. No. 8,085,168, which claims priority pursuant to 35 U.S.C. 119(e) to then co-pending U.S. Provisional Patent Application Ser. No. 60/806,555, filed Jul. 5, 2006, titled Electronic Flight Data Display Instrument, U.S. Provisional Patent Application Ser. No. 60/869,868, filed Dec. 13, 2006, titled Electronic Flight Data Display Instrument, and U.S. Provisional Patent Application Ser. No. 60/884,225, filed Jan. 10, 2007, titled Electronic Flight Data Display Instrument, the disclosures of which are incorporated herein by reference in their entirety.

COPYRIGHT NOTICE

The information disclosed in this application contains materials protectable by copyright.

BACKGROUND OF THE INVENTION

1. Field of the Invention

The present general inventive concept relates to data display instruments and, more particularly, to electronic aircraft flight data display instruments.

2. Description of the Related Art

Manned aircraft with an instrument panel 10 (illustrated in FIG. 8) displaying information used by a pilot during operation of the aircraft. For virtually every conventional aircraft manufactured in the last forty years, the instrument panel 10 includes mechanically-based instruments 12 mounted on a panel or dashboard 14. These conventional or legacy instruments 12 are typically a combination of bellows, gears, pointers, and spinning mass gyros enclosed in discrete three-inch round form factor. Most conventional aircraft include a tight cluster of six primary instruments 16 positioned directly in front of the pilot and directly above a control yoke (not shown). These primary instruments 16 are often collectively referred to as the "primary six" or "standard six." The standard flight instruments 16 are generally those instruments associated with the direct control of the aircraft and display information such as attitude, airspeed, altitude, and direction of flight. Instruments displaying less critical information are typically located immediately to the left and right of the standard six primary instruments 16 and measure and display an array of other flight deck functionality. Also contained on the instrument panel 10 is a wide array of cockpit indicators, switches, and other controls that often occupy the entire remaining instrument panel.

Each conventional instrument 12 typically performs a single function and mounts to the instrument panel 10 through a round hole (not illustrated in detail). A body (not illustrated) of the conventional instruments 12 protrudes from a rear of the instrument and is positioned in the dashboard 14 holes. The dashboard holes 14 may have various rearward clearances corresponding to the size of the rear protrusion of the instrument 12, which is controlled in large part by the mechanics associated with the instrument function. The dashboard 14 is usually a sturdy, single piece of aluminum that is part of the aircraft structure. The aircraft may be configured so that the dashboard 14 is a structural part of the aircraft and so that the dashboard contributes to the rigidity of the cabin or cockpit of the aircraft.

The layout of the instruments 12 within the standard six primary instruments 16 and the close proximity of instruments surrounding the standard six often result in instrument panels 10 having very close instrument-to-instrument hole spacing. Often there is less than 0.5 inch of space between adjacent three-inch diameter instruments.

As aircraft fleets age, there is a need to retrofit these conventional instruments 12 to reflect modern advances in electronics, computer software, and display technology. As part of this upgrade, it is often desirable to replace the standard flight instruments 16 because these instruments are most heavily depended upon during flight under Instrument Meteorological Conditions (IMC). They are also the instruments 12 most prone to failure given their dependence on precision pneumatic and gyroscopic components.

Commonly, during retrofit, the instrument panel 10 is completely removed from the aircraft and/or substantially re-designed to accommodate modern flight deck instrumentation. This extensive re-work is expensive and usually requires special authorization, modification qualifications, and certifications because it can adversely affect the structural integrity of the aircraft, including (among other things) cabin rigidity.

A device is sought that can be added to an aircraft being manufactured or as a retrofit replacement of conventional instruments 12 on a dashboard 14 of the aircraft without requiring modification to conventional dashboard design and without implicating (in any way) the structural integrity of the aircraft.

BRIEF SUMMARY OF THE INVENTION

The present general inventive concept relates to electronic display instrument or instruments configured to secure in a desired position over multiple pre-existing instrument holes in a dashboard of an aircraft in place of multiple conventional display instruments, each conventional instrument having a conventional readout. The present general inventive concept requires no significant modification to the existing dashboard in the aircraft as the invention's foot print fits the pre-existing instrument cut-outs on the instrument panel.

The instrument may include a display screen having a plurality of readouts. The instrument may provide for customized displays and customized presentation of data. Soft keys and controls located next to the displays may be configured to provide a specific function.

The instrument may further include a body having a front and a back opposite the front and a top and a bottom opposite the top. The body may be positioned adjacent and connected to the display screen. The instrument may also include an electronics module protruding from the back of the body to position in one of the pre-existing instrument holes in the dashboard panel of the aircraft.

In another aspect, the present general inventive concept relates to a method of replacing multiple adjacent conventional flight data instruments on a dashboard of an aircrafts instrument panel with an electronic display instrument including a body, display screen, and an electronics module extending from the back of the body. The method may include removing one, some, or all of the conventional flight data instruments from pre-existing holes in the dashboard and positioning the electronic display instrument in place of the conventional flight data instruments so the instrument covers a plurality of the pre-existing holes.

In yet another aspect, the present general inventive concept relates to a method of repairing an aircraft including a dashboard having a plurality of adjacent pre-existing instrument holes and a plurality of conventional instruments positioned in the pre-existing instrument holes to form an instrument panel. The method may include removing one, some, or all of the adjacent conventional flight data instruments from pre-existing holes in the dashboard and positioning an electronic display instrument in place of the conventional flight data instruments so the electronic display instrument covers a plurality of the pre-existing holes.

In still another aspect, the present general inventive concept relates to a method of upgrading an aircraft including a dashboard having a plurality of clustered pre-existing instrument holes and a plurality of conventional display instruments positioned in the pre-existing instrument holes to form an instrument panel. The method may include removing one, some, or all of the adjacent conventional display instruments from a plurality of the pre-existing holes in the dashboard and positioning an electronic display instrument in place of the conventional display instruments so the electronic display instrument covers a plurality of pre-existing holes exposed during the removal operation.

In still another aspect, the present general inventive concept provides a method of enabling the invention to interface with existing legacy components that are already installed in the aircraft, thus enabling the invention to work with a broad range of instrument types, both digital and analog instruments, and from a broad range of instrument manufacturers.

In yet still another aspect, the present general inventive concept relates to a method of operating an aircraft comprising power and communication lines and an instrument panel including an electronic display instrument comprising a display screen, a body having a front positioned adjacent and connected to the display screen and a back opposite the front, and a control module protruding from the back of the electronic display instrument, the control module including multiple connectors connecting the electronic display instrument to the power and communication lines of the aircraft. The method may include powering up the aircraft and powering up the electronic display instrument.

In a further aspect, the present general inventive concept relates to an aircraft instrument panel comprising an electronic display instrument secured in a desired position over multiple pre-existing instrument holes in a dashboard of an aircraft in place of multiple conventional display instruments, each conventional instrument having a conventional readout. The electronic display instrument may include a display screen having a plurality of readouts corresponding to the conventional readouts of the multiple conventional instruments that the electronic display instrument replaces and a body having a front and a back opposite the front and a top and a bottom opposite the top. The electronic display instrument may further include an electronics module protruding from the back of the body to position in one of the pre-existing instrument holes in the dashboard of the aircraft.

In still another aspect, the invention has an integrated battery back-up system that makes the invention independent from the aircraft's electrical power distribution system. The invention uses the aircraft's electrical power system for its primary power, but should there be a failure in the aircraft's system, the invention hay have an independent, integrated source of power. In a preferred embodiment, the back-up battery is intrinsic to the general inventive concept, but may be self-contained to isolate the battery.

The integrated battery back-up system may be used for the primary flight display instruments. It is housed in its own, self-contained cavity to isolate the battery from the other components of the general inventive concept. The back-up battery may utilize software logic to detect degradation of the aircraft's electrical system. If degradation is detected, then the software may switch the invention's power source from the aircraft electrical system to the battery back-up and notify the pilot.

The present general inventive concept may include a controller to control information displayed on the at least one display corresponding to signals the unit receives through at least one connector.

The present general inventive concept may include at least one controller positioned on the front side of the panel to control selectively the operation of the at least one display or operations of the aircraft.

In another aspect, the present general inventive concept relates to aircraft comprising a cockpit; and an instrument panel positioned in the cockpit may comprise an electronic display instrument secured in a desired position over multiple pre-existing instrument holes in a dashboard of an aircraft in place of multiple conventional display instruments, each conventional instrument having a conventional readout. The instrument may include a display screen having a plurality of readouts corresponding to the conventional readouts of the multiple conventional instruments that the electronic display instrument replaces and a body having a front and a back opposite the front and a top and a bottom opposite the top. The instrument may further include an electronics module protruding from the back of the body to position in one of the pre-existing instrument holes in the dashboard of the aircraft.

Some embodiments of the present general inventive concept relate to an electronic display instrument comprising a body having a front and a back, a display screen connected to the body, and a control module protruding from the back of the body to position in a pre-existing instrument hole in the dashboard panel of the aircraft wherein the control module includes some or all of a backup battery, a global positioning component such as a receiver, an air data computer, and an attitude heading reference system.

Other aspects of the present general inventive concept will be in part apparent and in part pointed out hereinafter.

DETAILED DESCRIPTION OF THE INVENTION

Figure 1:
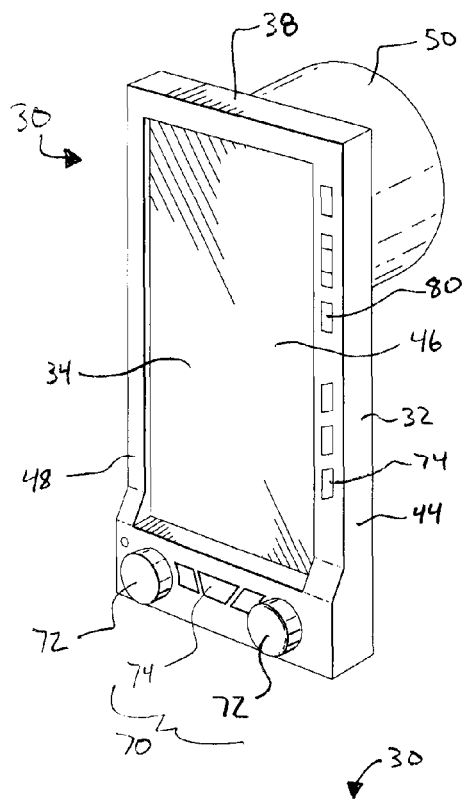
FIG. 1 is a perspective of an electronic display instrument according to the present general inventive concept.

Referring to the figures, and more particularly to FIGS. 1-4, an electronic flight data display instrument or form factor according to the present general inventive concept is designated in its entirety by reference number 30. The electronic display instrument 30 according to the present general inventive concept is designed to replace two or more conventional display instruments 12 (illustrated in FIG. 8). As will be described below in further detail, the electronic display instrument 30 can be retrofitted onto existing dashboards 14 (illustrated in FIG. 8) and digitally replicates information traditionally illustrated by the conventional instruments 12 being replaced. The electronic display instrument 30 according to the present general inventive concept is configured to be retrofitted onto unaltered dashboards of conventional aircraft. The electronic display instrument 30 can be attached to conventional dashboards 14 in place of conventional display instruments 12 without reconfiguring or otherwise manipulating the existing dashboard 14. Further, because the electronic display instrument 30 includes stand-alone electronics and may include a backup battery, users of the electronic display instrument will not need to recertify the emergency electrical load analysis of the entire aircraft when retrofitting the electronic display instrument on previously certified aircraft. Yet further, the electronic display instrument 30 according to the present general inventive concept can operate with generally no periodic maintenance or calibration.

The electronic display instrument 30 includes a housing or body 32 having a front 34, a back 36 opposite the front, a top 38, bottom 40 opposite the top, a left side 42, and a right side 44 opposite the left side. The electronic display instrument 30 further includes a display screen 46 and the front 34 of the body 32 forms a bezel or frame 48 surrounding and protecting the display screen. In one embodiment (not illustrated), the screen 46 may be frameless. The instrument 30 further includes a control or electronics can or module 50 protruding from the back 36 of the instrument body 32. The control module 50 has multiple connectors 52 configured to connect the data display instrument 30 to communication and control lines (e.g., pneumatic and electrical) of conventional aircraft. Although the control module 50 may have other sizes and shapes without departing from the scope of the present general inventive concept, in one embodiment the control module 36 is sized and shaped to fit snugly within a pre-existing instrument hole or compartment in the dashboard 14 of conventional aircraft exposed by removing a conventional display instrument from the dashboard to secure the instrument 30 in a desired position. In another embodiment the control module 50 is undersized to provide wiggle room to enable horizontal and vertical alignment of the instrument with existing instruments or, when multiple instruments are used in a single aircraft, alignment with multiple instruments, or angled as desired by a user to provide optimal viewing.

Although the body 32 may have other widths measured between the left side 42 and the right side 44 of the body without departing from the scope of the present general inventive concept, in one embodiment the body 32 has a width of between about 3 inches and about 4 inches. In a particular embodiment, the body 32 has a width of between about 3.3. inches and about 3.7 inches. In still another embodiment, the body 32 has a width approximately equal to a horizontal spacing between holes in the dashboard 14. Although the body 32 may have other heights measured between the top 38 and bottom 40 of the body without departing from the scope of the present general inventive concept, in one embodiment the body has a height of between about 6.5 inches and about 9 inches. In a particular embodiment, the body 32 has a height of between about 7 inches and about 8.5 inches. In still another embodiment, the body 32 has a height approximately equal to a vertical spacing between holes in the dashboard 14. Although the body 32 may have other maximum thickness measured between the front 34 and the back 36 of the body without departing from the scope of the present general inventive concept, in one embodiment the body has a thickness of between about 0.3 inch and about 1.5 inches. In a particular embodiment, the body 32 has a thickness of between about 0.5 inch and about 1.3 inches. The body 32 is sized and shaped so that the instrument 30 does not protrude into panel space associated with the other instruments (e.g., other electronic display instruments or conventional instruments) positioned directly above, below, or to the left or right of the instruments being replaced.

The body 32 may have various shapes without departing from the scope of the invention. In one embodiment, the body 32 is generally rectangular and the height is greater than the width. In one particular embodiment, the body 32 has a height about twice as big as the width. A single electronic display instrument 30 having this tall or portrait shape may be retrofitted onto the dashboard 14 in place of a top conventional display instrument and a bottom conventional display instrument that is below and adjacent to the top conventional display instrument of the six standard conventional instruments 16. It is contemplated that the body 32 may be made small enough to allow a user to selectively replace one, some, or all of the standard six instruments 16. In the case where the user is adding a second body 32 to a dashboard 14 already having a first body 32, the second body 32 may either be mounted in the preexisting hole formed upon removal of one of the conventional display instruments 12 or be mounted to the first body 32 via attachment means (not illustrated), including, but not limited to a hinge having screws or snaps. The attachment means can be on the side of, below, or above each body 32 so that additional bodies 32 may be incrementally added and mated to each other depending on the conventional display instruments 12 the user is replacing. The ability to selectively add one or more individual bodies 32 to each other provides significant versatility. Aside from allowing the user to selectively replace one, some, or all of the standard six instruments 16, the user may add one or more bodies 32 to other preexisting holes (not illustrated) that may be unrelated to the standard six instruments 16 and related to other instruments or components the user may desire to replace. Further, the user may mount one or more bodies 32 in a preexisting hole (not illustrated) not located in the dashboard 14. Or, the user may create one or more new holes in any location to mount one or more bodies 32.

Alternatively, it is also contemplated that the body 32 may be made tall enough to replace three or more conventional display instruments positioned contiguously in a column (e.g., the rightmost conventional instruments 12 of the top and bottom row of the standard six instruments 16 and a conventional display instrument or instrument position 19 below the rightmost two conventional instruments of the standard six instruments). It is also contemplated that the body 32 may be sized and shaped to replace a three row-by-two column cluster of conventional display instruments (e.g., the rightmost four conventional instruments 12 of the standard six instruments 16, two right lateral conventional display instruments 20, 21 to the right of the standard six, and another lateral conventional display instrument 22 positioned below the two right lateral conventional instruments).

In another embodiment, the body 32 is generally rectangular and the width of the body is greater than its height. In one particular embodiment, the body 32 has a width about three times as big as the height. A single electronic display instrument 30 having this wide or landscape shape may be retrofitted onto the dashboard 14 in place of a left conventional display instrument 12 of the standard six primary instruments 16 and a right conventional display instrument of the standard six that is directly adjacent the left conventional display instrument. It is envisioned that the electronic display instrument may be made wide enough to replace three conventional display instruments positioned contiguously in a row. For example, such an extra wide electronic display instrument 30 could replace a top three conventional instruments 12 of the six standard instruments 16 or a bottom three conventional instruments of the standard six instruments.

In yet another embodiment, the body 32 may be configured to replace four conventional display instruments positioned in a two row-by-two column arrangement. A body 32 according to this embodiment may be generally square-shaped.

In general, the electronic display instrument 30 may be configured to replace any configuration of conventional display instruments 12 positioned adjacent to each other. As an additional example of electronic display instrument 30 configurations, the body 32 may be L-shaped to replace, for example, a group of conventional display instruments 12 including a column of two or three conventional display instruments and a row of two or three conventional instruments sharing a common corner conventional instrument.

The body 32 may be made of various materials without departing from the scope of the present general inventive concept. For example, the body 32 may be made of materials commonly used in aircraft manufacturing.

Although the screen 46 may include other materials without departing from the scope of the present general inventive concept, in one embodiment the screen includes a protective cover. In one embodiment the cover is made of glass. The cover may also be made of other suitable materials such as various visually transparent polymers. Various types of display screens 46 may be used without departing from the scope of the present general inventive concept. For example, the display screen 46 may include a liquid crystal display (LCD). In one embodiment, the screen 46 is a thin-filmed transistor liquid crystal display (TFT LCD). The display screen 46 may have various sizes and shapes without departing from the scope of the present general inventive concept. For example, the screen may be generally rectangular, generally square, generally round, or generally oval. The screen 46 may have a height greater than its width. As described above regarding the body 32, screens 46 according to this embodiment are said to have a tall or portrait orientation. In one embodiment, the screen 46 is generally rectangular, has a width of between about 3 inches and about 3.5 inches, and has a height of between about 6 inches and about 6.5 inches. In some embodiments, the screen 46 has a width greater than its height. As described above regarding the body 32, these screens 46 are said to have a wide or landscape orientation.

The display screen 46 of the electronic display instrument 30 may have various characteristics and display qualities including state-of-the-art characteristics known in the display screen industry. For example, the display screen 46 may be high-resolution. The screen 46 may also be sunlight readable. In one embodiment, the electronic display instrument 30 includes a photo cell (not illustrated in detail) integrated into or mounted on the display screen 46 or other part of the instrument. The photo cell is connected to the backlighting of the display screen 46 and detects ambient light in the cockpit. The photo cell then transmits ambient light information to the backlight screen 46 so that a brightness and/or other characteristics (e.g., contrast) of the screen can be adjusted to improve readability of the screen by the pilot. In one embodiment, the photo cell is connected to the display screen 46 by way of the control module 50, which processes the ambient light information and controls the screen in accordance with that information.

The screen 46 may include an anti-reflective coating. The cover of the screen 46 may also be very strong to protect the screen and instrument 30 as described above. The display screen 46 may also display various colors. In one embodiment, the display screen 46 is a color active-matrix screen. The display screen 46 or the body 32 may include one or more elements (not illustrated in detail) to backlight the screen. For example, in an embodiment of the electronic display instrument 30 including an LCD screen 46, the elements backlight a glass structure of the LCD. In a particular embodiment, the backlight elements include a high-intensity white light emitting diode. The display screen 46 may have a dimming capability, such as an automatic dimming function whereby the screen dims under certain predetermined conditions. The electronic display instrument 30 may also be configured so that brightness and other characteristics of the screen (e.g., contrast) may be adjusted automatically (e.g., by the control module 50 in response to light information received from the photo cell described above) or manually by the pilot (e.g., by touching the screen or by using knobs or buttons, which are described in more detail below).

The display screen 46 may also display messages, such as aircraft and electronic display instrument 30 operation instructions or warnings. For example, indicator signals or annunciators (not illustrated in detail) can be integrated into the display to provide information regarding function of aircraft parts such as altitude, terrain warnings, cabin pressure, and gear alerts. An exemplary text message is "DEMO MODE", displayed when, e.g., the instrument 30 is operating in a demonstration mode as described below in more detail. Another exemplary message is "NO GPS", displayed when, e.g., global positioning system data is unavailable or flagged invalid by a GPS receiver positioned in the aircraft generally and perhaps in the electronic display device (as described below in more detail). Another exemplary message is "NO COVERAGE", displayed when, e.g., a current position of the aircraft falls outside of a terrain coverage area of the terrain data base. Another exemplary message is "LOW VOLTS", displayed when, e.g., the aircraft bus voltage is low. The instrument 30 may change to receive power from a backup battery (described more below) positioned in the control module. Another exemplary message is "LANDING", displayed when, e.g., the instrument 30 has determined that the aircraft is likely in a landing phase of flight based on variables that the instrument may receive information regarding and consider including distance to the nearest airport, direction of flight, altitude, and altitude rate. Another exemplary message is "ON GROUND", displayed when, e.g., the instrument 30 has determined that the aircraft is likely on the ground based on variables the device may receive information regarding and consider including ground speed. Another exemplary message is "DEPARTURE", displayed when, e.g., the instrument 30 has determined that the aircraft is likely in a post take-off departure phase of flight or in a missed-approach phase of flight, based upon variables the instrument 30 may receive information regarding and consider including, e.g., distance from the nearest airport, direction of flight, altitude, and altitude rate.

It is contemplated that the display screen 46 may be touch sensitive. For example, the electronic display instrument 30 may be configured so that a user can communicate with the control module 50 by touching the screen during use of the instrument.

The display screen 46 may display flight data information in one or more of a variety of formats. For example, the display screen 46 may display information numerically and/or graphically, such as on a real-time graph and/or on a real-time chart. In one embodiment, the electronic display instrument 30 is configured to display information on the screen in a bar graph or tape, such as a vertical tape or a horizontal tape. In this embodiment, the display screen 46 and/or the front 34 of the body 32 may include fixed tick marks (scale markings) and values to indicate the value of the variable. When the tick marks are positioned on the display screen 46, the tick marks may move or otherwise change. For example the tick marks may change in accord with a changing instantaneous value of the variable. The electronic display instrument 30 may be configured to display the same variable in multiple forms. For example, the display screen 46 may display a variable (e.g., altitude, attitude, or air speed) graphically and numerically. These various formats may be displayed alternately (e.g., in the same position on the screen 46) or at the same time in different positions on the screen.

Generally, the electronic display instrument 30 may display information in any conventional or state-of-the-art manner. In one embodiment, the instrument 30 uses colors to indicate aspects of the information being displayed. For example, when the instrument 30 displays a value numerically, that number may be green when it is positive and red when it is negative. As another example of numerical color coding, a numerical representation of a variable can be displayed in various colors corresponding to particular ranges of that variable. For example, a numerical representation of elevation can illustrated with yellow, light green, dark green, red, magenta, and blue corresponding to ranges that the elevation is at the particular time.

Graphical representations can also be color-coded in various ways. For example, the electronic display instrument 30 can be configured to display a map (e.g., a topographical map, a weather map, or a global positioning map) having colors corresponding to known aspects of the map, such as changes in terrain, such as changes from land to water or changes in ground elevations, weather patterns, or monuments (e.g., towers and runways).

The electronic display instrument 30 may display multiple types of information in various areas or blocks. In the case that the electronic display instrument 30 replaces at least two conventional instruments 12 of the standard six primary instruments 16, the electronic display instrument 30 may be configured to display at least two types of information corresponding to the information that was displayed by the conventional instruments 12. For example, one of the two types of information that the electronic display instrument 30 may display may include speed corresponding to the speed values conventionally displayed by a vertical speed indicator (VSI) of the standard six instruments 16. In one embodiment, the electronic display instrument 30 is configured to display at least two pieces of information selected from a group of information types consisting of attitude, speed, altitude, terrain, weather, general navigation, traffic, lighting, engine, fuel, and other aircraft status or performance. However, the electronic display 30 is not limited to displaying information that was displayed by the conventional instruments 12 and may display any number of types of information. For example, in addition to displaying the data that was displayed by the conventional instruments 12, the electronic display 30 may display another type of information obtained from a result of factoring the data that was displayed by the conventional instruments 12. Another type of information that may be displayed includes information gathered from one or more additional components, such as but not limited to an after-market upgrade device.

Figure 2:
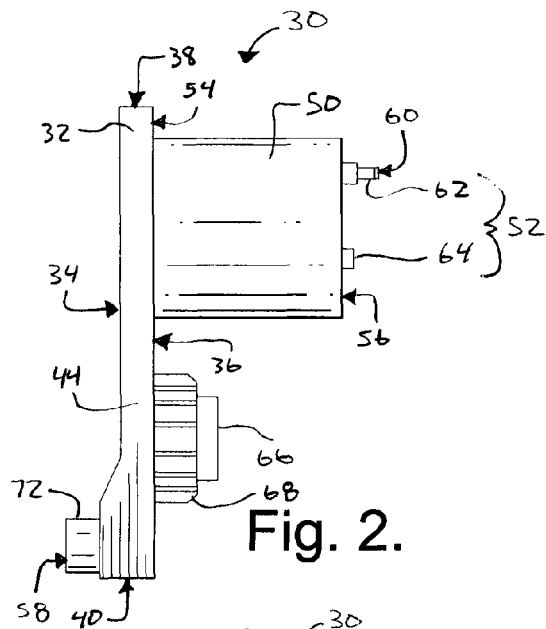
FIG. 2 is a side view of the electronic display instrument of FIG. 1.
Figure 3:
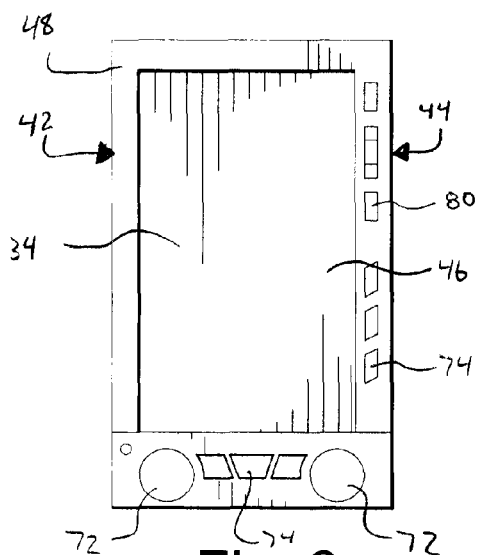
FIG. 3 is a front elevation of the electronic display instrument of FIG. 1.
Figure 4:
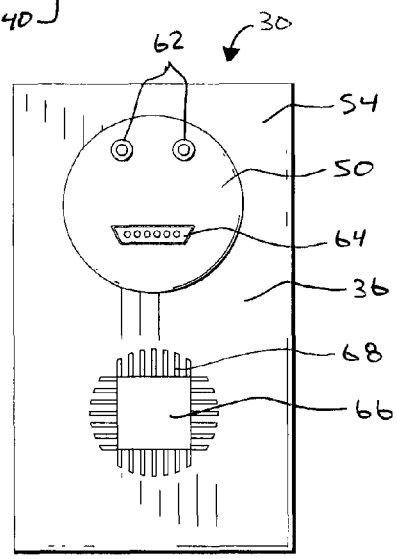
FIG. 4 is a rear elevation of the electronic display instrument of FIG. 1.
Figure 6:
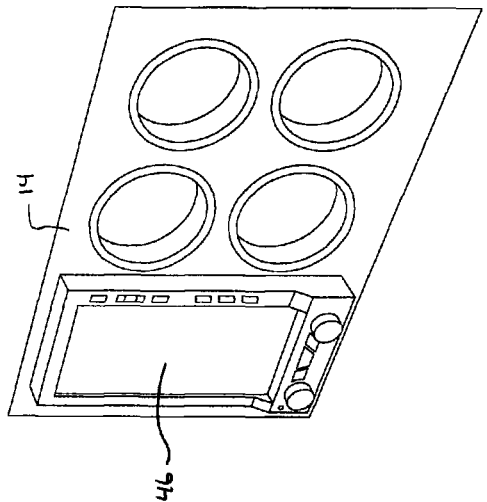
FIG. 6 is a front perspective of the electronic display instrument of FIG. 1 in a dashboard.
Figure 5:
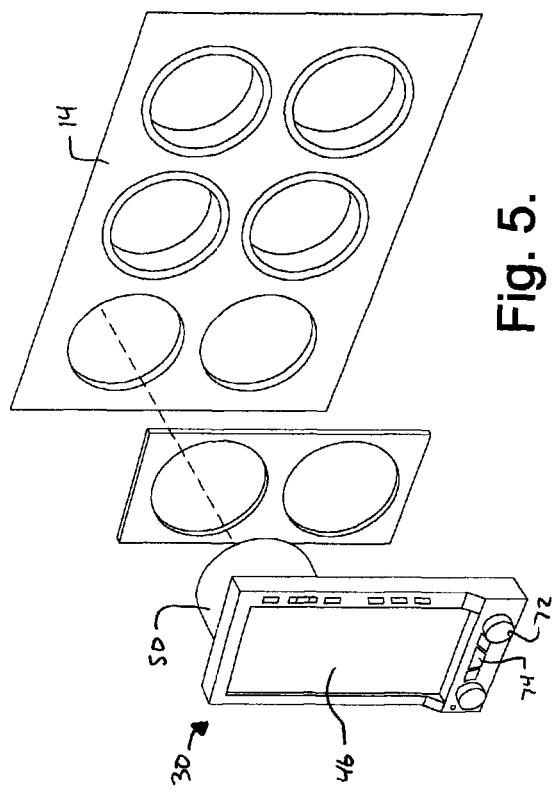
FIG. 5 is an exploded front perspective of the electronic display instrument of FIG. 1 in a dashboard.
Figure 7:
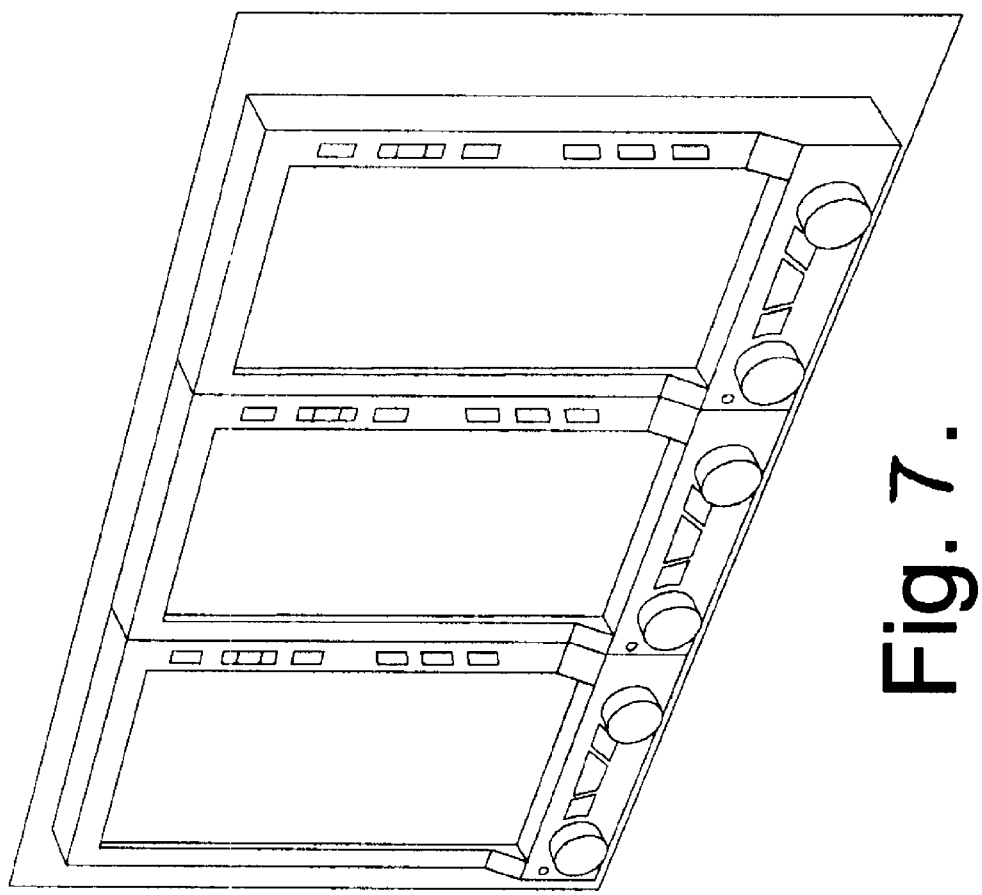
FIG. 7 is a front perspective of three electronic display instruments of FIG. 1 positioned in a row in a dashboard.

The electronics module 50 may have various sizes and shapes without departing from the scope of the present general inventive concept. In general, the control module 50 is sized and shaped to fit as desired within a pre-existing hole in the dashboard 14 (illustrated in FIG. 8) exposed by removing a corresponding conventional instrument 12 therefrom. In a common embodiment, the electronics module 50 has an outer diameter of about 3 inches corresponding with traditional three-inch diameter dashboard holes for the standard six primary instruments 16. In one of the embodiments of the electronic display instrument 30 having a rectangular-shaped body 32, the electronics module 50 extends from the back 36 of the body closer to one end of the body than to an opposite end of the body. For example, as illustrated in FIG. 2, the electronics module 50 extends from the back 36 of the body 32 closer to the top 38 than to the bottom 40. In this way, the electronics module 50 may be positioned in a pre-existing upper hole of a pair of holes in the dashboard 14 exposed by removing a conventional instrument 12 so the body 32 covers that upper hole and a lower hole of the pair of holes that is directly adjacent and below the upper hole.

Although the electronics module 50 may have other depths, which can be called a "can depth", measured between a base 54 (illustrated in FIG. 2) of the electronics module adjacent the body 32 and an end 56 of the electronics module, in one embodiment the electronics module has a depth of between about 3 inches and about 4 inches. In a particular embodiment, the can depth is about 3.4 inches. In general, the can depth corresponds to a rearward clearance (not illustrated) of the pre-existing dashboard hole that the electronics module 50 will be positioned in, considering space needed for the connectors 52 and any adapters (described in more detail below) that may be needed to connect the module to power, ground, and communication lines of the aircraft. Although the electronic display instrument 30 may have other overall depths measured between a foremost part 58 of the instrument (e.g., a tip of a knob extending from the front 34 of the body 32 as illustrated in FIG. 2 and described below) and a rearmost tip 60 of the connectors 52 of the electronics module 50 without departing from the scope of the present general inventive concept, in one embodiment the electronic display instrument has an overall depth of between about 4 inches and about 4.5 inches. In one particular embodiment, the overall depth of the electronic display instrument 30 is about 4.25 inches.

The electronics module 50 includes electronics (not illustrated in detail) to control the electronic display device 30 including controlling what is displayed on the display screen 46 in light of the signals being received from the communication lines of the aircraft and other signal sources (e.g., satellites sending global positioning information). The electronics may include any state-of-the-art electronic components. In one embodiment, the electronics module 50 includes compact solid state electronics. The electronics in the electronics module 50 and the display screen 46 may be configured to display any information associated with modernized functionality of a flight deck.

The electronics module 50 may include a global positioning system (GPS) receiver (not illustrated). The GPS receiver receives information from a GPS source, such as a GPS satellite, about the position of the receiver (and thus the aircraft on which the electronic display instrument 30 is mounted) on earth. The aircraft may include a database (not illustrated) of stored global positions (e.g., a global map) against which the GPS information about the position of the receiver can be compared to communicate to a user of the GPS system (e.g., pilots and tower controllers) the particular global position of the aircraft. In one embodiment, the electronics module 50 includes a computer (not illustrated), which may hold the GPS database. As will be appreciated by those skilled in the art, the database may be stored in, among other places, a memory of the computer of the electronics module 50, a memory device on the aircraft (e.g., in the electronics module 50), such as a compact disk or memory card, or in a computer or server remote from the aircraft and accessed by the aircraft by wireless communications. In one embodiment, the GPS receiver receives GPS information including the GPS global mapping information from the same GPS source (e.g., satellite). In a particular embodiment, the database is stored on a data card (not illustrated) that is inserted into a card slot (not illustrated) in the body 32 or electronics module 50.

The GPS database may need to be updated periodically because elements of GPS database information (e.g., GPS map images), such as terrain characteristics, positioning of obstructions, and existence of airports, sometimes change. The GPS information may be provided by the government and updated periodically. For embodiments of the electronic display instrument 30 in which the GPS database is stored on a removable device, such as the data card described in the preceding paragraph, cards may be provided by companies using the updated government information to users of the instrument with a date label. The user may insert the updated data card in the data card slot and cover the slot with the corresponding date label. In this way, maintenance personnel or other persons can easily see what version of GPS data the electronic display instrument 30 is using. Providers of such GPS image data cards may provide regular updates of the cards, such as every six months (approximately).

The electronics module 50 may also include an attitude heading reference system. The electronic display instrument 30 may also include internal rate sensing, such as that derived from an integrated pressure transducer (not illustrated), or may obtain and/or compute rate information from another source, such as an air data computer (not illustrated). In one embodiment, the computer is configured to process GPS information and air data information. The electronic display instrument 30 may also use other suitable methods of obtaining or providing rate data. For example, the instrument 30 may use a combination of internal and external rate sensing or measurement.

The electronics module 50 may also include a backup battery (not illustrated). The battery in the electronics module 50 is a backup to the primary power received by the module by way of the connectors 52. The backup battery can power the electronic display instrument 30 in the event of loss of primary power to the electronic display instrument 30 from the aircraft (e.g., a power line to the instrument is severed). In a preferred embodiment, the back-up battery is self-contained and intrinsic to the invention.

The battery back-up system is used for the primary flight display instruments. It is housed in its own, self-contained module to isolate the battery from the other components of the invention. The back-up battery utilizes software logic to detect degradation of the aircraft's electrical system. If degradation is detected, then the software will switch the invention's power source from the aircraft electrical system to the battery back-up and notify the pilot.

It is envisioned that the electronic display instrument 30 includes multiple electronics modules (not illustrated). For example, when the electronic display instrument 30 is configured to replace a two row-by-two column cluster of four conventional display instruments 12 (illustrated in FIG. 8) as described above, the electronic display instrument may include two electronic display devices positioned side-by-side on the back 36 of the body 32 adjacent the top 38 of the body. In this way, the two electronics modules 50 may be positioned in a top two pre-existing dashboard holes of the four pre-existing dashboard holes exposed by removing the four conventional display instruments 12.

The number of electronics modules 50 that the electronic display instrument 30 has does not necessarily correspond to the number of conventional display instruments 12 that the electronic display instrument is replacing. For example, in one embodiment the electronic display instrument 30 is configured to replace all of the standard six conventional instruments 16 and includes a single electronics module 50 protruding from the back 36 of the body 32 along a centerline (not illustrated in detail) of the device adjacent to the top 38 of the body. In this way, the single electronics module 50 is positioned in an upper central pre-existing hole of the holes exposed by removing the standard six conventional instruments 16 and the body 32 covers all six of the pre-existing holes.

The electronic display instrument 30 may include a variety of connectors 52 without departing from the scope of the present general inventive concept. The connectors 52 correspond to the power/ground and communication lines directed to the pre-existing hole exposed by removing the conventional display instruments 12 in which the electronics module 50 is positioned when the electronic display instrument is positioned in the desired position on the dashboard 14 (illustrated in FIG. 8). The connectors 52 may include a pneumatic connector 62. The pneumatic connector 62 may interface with a pitot static system of the aircraft. In one embodiment, the pneumatic connector is a traditional 0.125 inch NPT pneumatic connector.

The connectors 52 also include an electrical connector 64. The electrical connector 64 may be a multi-port (e.g., a multi-pin) connector to receive simultaneously a variety of signals. In one embodiment, the electrical connector 64 is a 15-pin male "d-sub" connector. The pins of the electrical connector 64 may be solid, machined pins for durability. A 15-pin male connector 64 may be used corresponding to a 15-pin female "d-sub" connector of the aircraft positioned adjacent a bottom (not illustrated) of the pre-existing hole of the dashboard 14. The various ports or pins of the electrical connector 64 receive or output various types of information. For example, one of the pins (e.g., pin 1) of the multiple pins of the electrical connector 64 may be designated to receive power (e.g., main DC power or positive input) and an adjacent pin (e.g., pin 9) may be designated as ground (e.g., main DC power negative or ground connection). As another example, the electrical connector 64 may be configured so that one particular pin (e.g., pin 5) of the multiple pins of the electrical connector is a serial input for GPS information. Data signals may be transmitted to the electronic display instrument 30 in a variety of formats without departing from the scope of the present general inventive concept. For example, GPS data may be received from a GPS navigator positioned on the dashboard 14 (illustrated in FIG. 8) or within the electronics module 50 in a serial format such as a RS-232 format.

Because of differences between the connectors 52 of the electronic display instrument 30 and corresponding connectors of the communication lines of the aircraft, adapters (not illustrated) may need to be used. In some embodiments, supplemental connector materials may be used to ensure strong connections between the connectors 52 of the electronic display instrument 30 and the connectors of the communication lines of the aircraft. For example, for a pneumatic connection, a user may use tape such as Teflon® tape to ensure a hermetically sealed connection. Teflon is a registered trademark of E.I. Du Pont De Nemours and Company Corporation of Wilmington, Del. The electronic display instrument 30 may be manufactured, distributed, and/or sold with a connector kit (not illustrated). The connector kit may include connector components such as a connector housing, a sliding locking mechanism, and crimp pins.

The electronic display instrument 30 may or may not further include a supplemental module 66 (illustrated in FIG. 2) protruding from the back 36 of the body 32. The supplemental module may serve various purposes. For example, the supplemental module 66 may be positioned on the back 36 of the body 32 so that it is positioned in a pre-existing hole of the dashboard 14 adjacent a pre-existing hole of the dashboard in which the electronics module 52 is positioned in when mounting the electronic display instrument 30 in the desired position on the dashboard. By being positioned in one of the pre-existing holes, the supplemental module 66 contributes to the securing of the electronic display instrument 30 to the dashboard 14.

The supplemental module 66 may or may not include a cooling fan 68, as illustrated in FIG. 2. The cooling fan 68 may operate in various ways without departing from the scope of the present general inventive concept. The fan 68 may blow air pulled from behind the dashboard 14 through a passage in a side (not illustrated) of the pre-existing dashboard hole in which the supplemental module 66 is positioned when the electronic display instrument 30 is positioned as desired. The fan 68 may operate continuously, regularly, or intermittently during operation of the electronic display instrument 30. The fan 68 may be connected to and controlled by the electronics module 50. The electronic display instrument 30 may also include one or more temperature gages (not illustrated) connected to the fan 68 and/or electronics module 50 and the fan and/or electronics module 50 may be programmed selectively to operate the fan when a temperature of the instrument is over a predetermined temperature.

In one embodiment (not illustrated), the electronic display instrument 30 includes more than one supplemental module 66. Any number of these multiple supplemental modules 66 may include cooling fans 68. The supplemental modules 66 are positioned on the back 36 of the body 32 corresponding to locations of the pre-existing dashboard holes in which the supplemental modules will be positioned when the instrument 30 is positioned on the dashboard 14 as desired.

In another embodiment (not illustrated) the electronics module 50 is positioned on the back 36 of the body adjacent to the bottom 40 of the body and the supplemental module 66 is positioned on the back 36 of the body adjacent to the top 38 of the body. In yet another embodiment, the electronic display instrument 30 has no supplemental module 66 and the electronics module 50 can be located adjacent to either the top 38 of the body or the bottom 40 of the body.

In one embodiment (illustrated in FIG. 2), the electronics module 50 is positioned on the back 36 of the body adjacent to the top 38 of the body 32 and the supplemental module 66 is positioned on the back of the body adjacent to the bottom 40 of the body. In this way, the electronics module 50 and the supplemental module 66 may be positioned in pre-existing top and bottom holes of an adjacent top/bottom pair of pre-existing holes, respectively, which were exposed by removing a top/bottom pair of conventional display instruments 12.

The supplemental module 66 may have various shapes and sizes without departing from the scope of the present general inventive concept. In one embodiment, the supplemental module 66 has a maximum dimension (e.g., a diameter, a width, a height, or a distance between a top left corner and a bottom left corner) of about 3 inches corresponding to the three-inch diameter of conventional dashboard holes. Among other shapes, the supplemental module 66 may be generally round, oval, or square.

In still another embodiment, the invention may not utilize a supplemental module 66 but utilize only an electronics module 50.

The electronic display instrument 30 may also include one or more user interface elements 70 such as knobs 72 and buttons 74 (illustrated in FIG. 1) positioned adjacent to the front 34 of the body 32. The electronic display instrument 30 may be configured so that the user interface elements 70 can be used for a variety of purposes. For example, the user interface elements 70 can be used to communicate with the electronics module 50, such as to initiate a re-boot of the electronics module computer. The user interface elements 70 may also be used to manipulate the display of the instrument 30. For example, the user may manipulate the knobs 72 to manipulate the data presented on the display screen 46, such as toggling between various views, formats (e.g., graphical versus numerical display format), and languages and to adjust screen display characteristics (e.g., brightness and contrast).

Various types of knobs 72 may be used. In one embodiment, the knobs 72 are optical encoder knobs. The knobs 72 may have a memory push function. That is, the knobs may be configured so that they will stay in a down/up position on alternating pushes and the electronics module 50 is controlled in a different way by the knob 72 when the knob is down compared to when it is up. In one embodiment, referring to FIG. 3, instrument 30 provides for customized displays on display screen 46 and customized presentation of data. A soft key 80 located next to display screen 46 will allow the user to configure soft key 80 to provide a specific function that can be programmed by the user. In a preferred embodiment, there are multiple soft keys and the user can program each with preprogrammed information so that display screen 46 is customized the way each user prefers. The soft keys may relate to various topics such as "TERRAIN", "TRAFFIC", "WEATHER", or "AUX/SETUP" for the user to choose from. These various topics can be programmed in a different arrangement at the user's discretion. However, it will be appreciated that for safety reasons some function may not be programmable but rather will be set functions. The package purchased by the user may determine the functionality of the knobs and controls and what information is displayed to the user. For example, such packages may include the "Pilot", the "Pro", and the "ATP,"

with each offering differing levels of functionality. There are a plurality of functions and various operations that different software can have.

Figure 8:
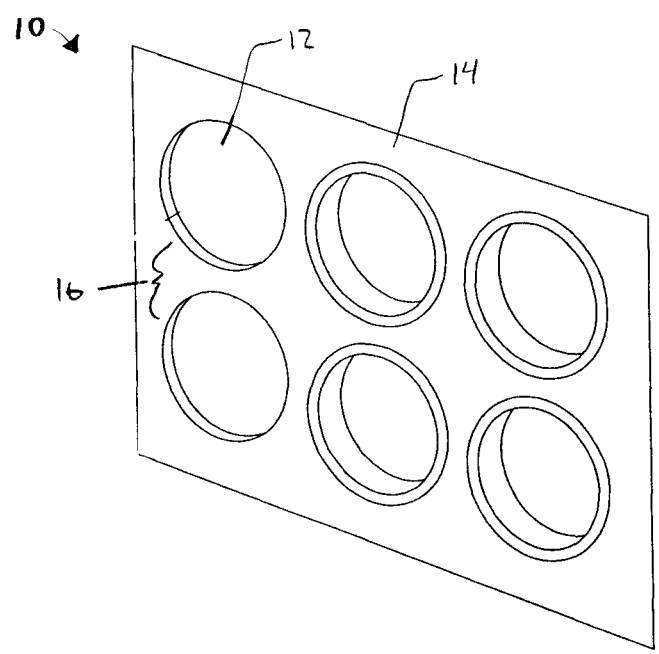
FIG. 8 is a front perspective of a conventional instrument panel including legacy display instruments positioned on a dashboard.

As described above, use and functionality (i.e., information displayed) of the electronic display instrument 30 is not limited by the standard six primary instruments 16 (illustrated in FIG. 8). That is, the electronic display instrument 30 may replace other conventional instruments 12 (illustrated in FIG. 8) or replicate information from other conventional instruments outside of the standard six primary instruments 16. In general, the electronic display instrument 30 may display any information that the user desires for use by the pilot during operation of the aircraft.

The electronic display instrument 30 may replace a conventional primary attitude/heading instrument. In such embodiments, the instrument 30 is said to be acting as a primary flight display (PFD). The electronic display instrument 30 may also replace conventional navigational instruments. In such embodiments, the instrument 30 is said to be acting as a multi-functional display (MFD). The electronic display instrument 30 may also replace a conventional engine instrument. In such embodiments, the instrument 30 is said to be acting as an engine monitor display (EMD). The electronic display instrument 30 may act as any combination of a PFD, an MFD, and an EMD. The instrument 30 may be used in other ways as well, including those described above. When being used as a replacement for conventional instruments 12 as a PFD, an MFD, and/or an EMD or replacing additional or other conventional aircraft instruments, the electronic display instrument provides dramatically improved reliability over its mechanical counterparts. Further, when being used as a replacement for conventional instruments 12 as a PFD, an MFD, and/or an EMD or replacing additional or other conventional aircraft instruments, the electronic display instrument provides dramatically improved situational awareness over its mechanical counterparts. Situational awareness is a term-of-art referring generally to an awareness of the pilot regarding all things related to operation of the aircraft. For example, easy to read displays and accurate warning systems increase situational awareness and facilitate successful flight. Further, when being used as a replacement for conventional instruments 12 as a PFD, an MFD, and/or an EMD or replacing additional or other conventional aircraft instruments, the electronic display instrument provides dramatically improved accuracy over its mechanical counterparts.

The electronic display instrument 30 according to the present general inventive concept may be used in a variety of ways including those described above. Particular methods of using the electronic display instrument 30 include a method of replacing multiple adjacent conventional flight data instruments with the electronic display instrument. Another method of using the electronic display instrument 30 is a method of upgrading or updating an aircraft by replacing multiple adjacent conventional flight data instruments with the electronic display instrument. Yet another particular method of using the electronic display instrument 30 is a method of repairing an aircraft. Still another particular method of using the electronic display instrument 30 is a method of operating the aircraft.

In all of the methods of using the electronic display instrument 30, the instrument can be installed on the aircraft in a non-obtrusive manner. That is, the instrument 30 can be fitted or retrofitted onto the dashboard 14, and specifically to pre-existing dashboard holes (not illustrated) exposed by removing conventional display instruments 12 (illustrated in FIG. 8), without substantially altering the dashboard. This approach alleviates problems associated with other state-of-the-art installations that require modifications to the dashboard, or replacement/relocation of existing equipment caused by space constraints of the aircraft instrument panels.

The present general inventive concept provides a method of enabling the invention to interface with existing legacy components that are already installed in the aircraft, thus enabling the invention to work with a broad range of instrument types, both digital and analog instruments, and from a broad range of instrument manufacturers. The invention includes an Avionics Converter Unit (ACU), which accepts the legacy signals from many different manufactures utilizing different signal protocols and then converts these disparate signals into a digital signal reflecting a single, industry standard protocol in order to enable the existing legacy instrumentation to interface with the invention. In a preferred embodiment the ACU is a separate device but the ACU can be integrated into the electronic display instrument.

The ACU accepts signals from many different manufacturers utilizing many different protocols. The ACU software detects the signals and can identify which protocols are being utilized. The software then interprets these signals and converts them into an industry standard protocol. The converted signals are then transmitted to the invention and provide flight information for the invention to interpret and display on the instrument 30.

The ACU can contain but is not limited to the following primary interfaces: (1) VOR (very high frequency omnidirectional radio range)/Localizer deviation; (2) Glide Slope deviation; (3) GPS (Global Positioning System) mode annunciations; (4) GPS/OBS (omni bearing selector) Interface; (5) Radar Altimeter Decision Height annunciation; (6) Autopilot Flight Director command bar interface; (7) Autopilot Heading Error Interface; (8) Autopilot/VHF (very high frequency) Nav lateral and vertical guidance; (9) Autopilot/VHF Nav Course Error Interface; and (10) ARINC 429 Low Speed Interface with the electronic display instrument 30 Attitude/Horizontal Situation.

The ACU receives a Nav Composite signal from an existing VHF Navigation radio receiver. This signal will contain either VOR bearing information or Localizer information. The VHF Nav radio uses the state of the "tune-to-loc" discrete is used to indicate the data on the composite signal. ("Tune-to-Loc" is also referred to as "ILS Energize". Both terms are used interchangeably). If the "tune-to-loc" is false (discrete not grounded), the composite signal contains a 30 Hz reference component and 30 Hz variable phase component. The reference signal is modulated onto the composite signal so that its phase is independent of the aircraft bearing from the VOR ground station. The variable phase is modulated onto the composite signal so that its phase differs by an angle that is equal to the bearing of the aircraft from the VOR ground station. The 30 Hz variable phase signal is applied by amplitude modulating (AM) the composite signal. The 30 Hz reference signal is placed on the composite signal using a subcarrier of 9960 Hz superimposed onto the AM modulated 30 Hz variable phase signal. The 9960 subcarrier is frequency modulation (FM) with the 30 Hz reference signal. The peak FM deviation is 480 Hz. The bearing FROM the VOR ground station is simply the phase difference between the 30 Hz reference and the 30 Hz variable signals.

The ACU circuitry demodulates filters and amplifies the reference signal and the variable phase signal then applies these two signals to the XA-G49 processor as a pair of 30 Hz square wave signals. The processor uses one of its internal counters to measure the time between the rising edge of the reference and the rising edge of the variable signals. This counter value is proportional to the FROM bearing. This count is converted into degrees +180 deg (VOR bearing is FROM, RMI bearing is TO) then sent out over the 429 port as RMI bearing on GAMA label 222. The processor computes course deviation and To/From by comparing the RMI bearing derived from the composite signal and the selected course pointer angle read from the AIRNC 429 input port label 100. The selected course pointer angle is set by the pilot to select the desired VOR radial. When the RMI bearing and Selected Course Pointer angles are within ±180 degrees of each other, the TO/FROM state is TO, otherwise it is FROM.

The XA-G49 counter is configured to operate from the internal 25 MHz clock with a pre-scale divide of 16. The period of the 30 Hz reference is 33⅓ milliseconds, which is equivalent to 2 PI radians, or 360 degrees of rotation. Therefore, the counter can reach 52,083 in 33⅓ ms which translates to 144.675 counts per degree, or 0.0069 12 degrees per count so that:

Bearing (deg)=count*0.006912 (range from 0 to 360)

Course deviation is set to full scale when difference between RMI bearing and Selected Course angle is equal to 10 degrees. The needle deflects right of course when the selected course angle is less than RMI bearing. The deflection is linear across the range of −10 degrees to +10 degrees. Course deviation is also converted to a ±150 mV analog left/right signal and valid flag for use by the autopilot NAV mode. For those autopilots that accept the input, selected course is also converted to analog.

When "tune-to-loc" is true (discrete grounded), signifying the VHF Navigation radio is tuned to a Localizer frequency, the composite signal contains a 90 Hz and 150 Hz signal pair. The Localizer ground station produces these signals such that when the aircraft is left of centerline, the 90 Hz signal is stronger and the 150 Hz signal is stronger when the aircraft is right of centerline. When the aircraft is on centerline, these signals are of equal amplitude.

The ACU filters, amplifies and rectifies both the 90 Hz and 150 Hz components of the localizer composite signal supplied from the VHF Nav receiver. These direct current (DC) signals are then applied to the Analog-to-Digital (A2D) converter. The A2D values read by the XA-G49 processor are proportional to the 90 Hz and 150 Hz signals at the aircraft's localizer antenna. The difference in these to DC values is used to produce the Localizer deviation output over the ARINC 429 port. The TO/FROM flag is hidden during localizer operation and the course pointer angle input is ignored. Localizer deviation is also converted to a ±150 mV analog left/right signal and valid flag for use by the autopilot NAV/APPR mode. Localizer deviation is output in GAMA label 173.

The glide slope deviation and validity is supplied to the ACU from the VHF Navigation radio as a set of low level DC voltages. Glide Slope deviation is a +/−150 mV signal proportional to the aircrafts position relative to the intended glide path. The validity flag signal is greater than 125 mV for valid. The GS deviation and flag signals are amplified by the ACU then sent to the A2D where the XA-G49 periodically reads and processes them along with the ILS Energize discrete. When ILS Energize is true (ILS Energize discrete grounded) and GS Valid is true, the ACU outputs valid glide slope data on the ARINC 429 output bus. The Glide slope deviation input and flag are buffered and repeated by the ACU for use by the autopilot NAV/APPR mode.

The GPS mode annunciation interface is a series of discretes supplied by the GPS that are read by the ACU and conveyed to the electronic display instrument 30 over the ARINC 429 output bus a set of labels to be determined.

The GPS/OBS interface and an analog output signal from the ACU to the GPS that is proportional to the selected course inputs sent from the electronic display instrument 30 HSI. It is used by the GPS when operating in OBS mode (pseudo-VOR). Pre-WAAS receivers enter this mode to enable the pilot to execute procedure turns and holding patterns since none but the Trimble series supported the necessary ARINC 424 leg types to auto sequence through these procedures.

The software will write a 16-bit word (14 data bits and 2 D2A control bits) serially to a Digital to Analog converter (D2A). The hardware associated with the D2A will condition the signal for compatibility with the Garmin OBS interface.

Referring to the radar altimeter decision height annunciation, the ACU reads the state of the Decision Height indicator supplied by the Radar Altimeter. The ACU amplifies this signal and sends it the XA-G49 as a signal discrete such that a one (high) equals "DH" indicator ON. The state of the DH annunciation is output over the ARINC 429 bus.

The autopilot heading error interface is when the software will read a set of configuration settings supplied by hardware that configure the ACU to emulate the desired heading error characteristics of the HSI or DG that was replaced by the electronic display instrument 30 HSI.

The software will write a pair of 16-bit words (14 data bits and 2 D2A control bits) serially to a pair of Digital to Analog converters (D2A). One D2A sets the overall gain based on program pin setting; the second provides the scaled heading error signal. The hardware associated with the D2A will further condition the signal for compatibility with the target autopilot heading error input.

ARINC 429 Low Speed Interface with the electronic display instrument 30 Attitude/Horizontal Situation Indicator Transmit and Receive baud rates are low speed, 12.5 KHz.

Although installation of the device is primarily described in repair, upgrade, retrofit, and updating applications, it is envisioned that the device may be used in new manufacturing as well. For example, the instrument 30 may be placed in conventional dashboard 14 holes instead of conventional instruments during original manufacture. Also, the instrument 30 can be placed in newly-formed holes in the dashboard that are or are not conventionally shaped. For example, holes can be formed in the dashboard 14 during manufacture that are tailored to receive the electronic display instrument 30.

As mentioned, one of the ways to use the electronic display instrument 30 is in a method of replacing multiple adjacent conventional flight data instruments 12. The conventional or legacy flight data instruments are positioned on a dashboard 14 of an instruments panel 10 and the electronic display instrument 30 including a body having a front display screen 46, a back 36, and a electronics module 50 extending from the back of the body. This method includes removing the conventional flight data instruments 12 from holes (not illustrated) in the dashboard 14. This method also includes positioning the electronic display instrument 30 in place of the conventional flight data instruments 12. This positioning operation includes positioning the electronics module 50 of the electronic display instrument 50 in one of the dashboard holes exposed by removing the legacy instruments 12. Further, this method may include connecting the electronic display instrument 30 to the communication lines of the aircraft by way of the connectors 52.

For embodiments of the electronic display instrument 30 including the supplemental module 66, the method may include positioning the electronics module 50 in a top hole of a pair of adjacent conventional or pre-existing instrument holes and positioning the supplemental module in a lower hole of the pair of conventional instrument holes. The removing operation may include removing a left conventional flight data instrument 12 of a side-by-side pair of conventional flight data instruments from a left hole of the holes and removing a right conventional flight data instrument of the pair of conventional flight data instruments from a right hole of the holes that is directly adjacent to the top hole and positioning the electronic display instrument 30 may include covering the left hole and right hole with the electronic display instrument.

When the instrument 30 is used to replace multiple adjacent conventional instruments 12 arranged in a two row-by-two column cluster, the removing operation of the method includes removing the four conventional instruments. In this particular embodiment, the positioning operation of the method includes positioning one electronic display instrument in place of a left top/bottom pair of the four instruments and positioning another electronic display instrument in place of a right top/bottom pair of the four instruments. Alternatively for this particular embodiment, the positioning operation may include positioning one electronic display instrument 30 in place of a top side-by-side pair of the four instruments 12 and positioning another electronic display instrument in place of a bottom side-by-side pair of the four conventional instruments. In another aspect, the positioning operation may include positioning a single electronic display instrument 30 in place of the four conventional instruments.

When the instrument 30 is used to replace a cluster of six conventional instruments 12 positioned in a two row-by-three column arrangement, the removing operation includes removing the six conventional instruments. For this particular embodiment, the positioning operation may include positioning a right electronic display instrument 30 in place of a left top/bottom pair of the six conventional instruments, positioning a middle electronic display instrument in place of a middle top/bottom pair of the six conventional instruments, and positioning a right electronic display instrument in place of a right top/bottom pair of the six conventional instruments. Alternatively for this particular embodiment, the positioning operation includes positioning a single electronic display instrument 30 in place of the six instruments.

As mentioned above, another way to use the electronic display instrument 30 is in a method of upgrading an aircraft. This method includes removing the adjacent conventional flight data instruments 12 from the pre-existing holes in the dashboard. The method further includes positioning an electronic display instrument 30 in place of the conventional flight data instruments 12 so the electronic display instrument covers pre-existing holes exposed during the removal operation. This method may include adding adapters to at least one of the connectors and/or to at least one of the lines.

As mentioned above, yet another way of using the electronic display instrument 30 is in a method of repairing an aircraft. This method includes removing the adjacent conventional flight data instruments from pre-existing holes in the dashboard and positioning an electronic display instrument 30 in place of the conventional flight data instruments so the electronic display instrument covers the pre-existing holes.

As still another way of using the electronic display instrument 30 is a method of operating an aircraft. This method includes powering up the aircraft and powering up or starting the electronic display instrument. In one particular embodiment, the instrument 30 is powered up automatically when the aircraft is powered up. For embodiments of the instrument 30 including a supplemental module having a cooling fan, the method of flying the aircraft may further include cooling the electronic display instrument using the cooling fan. For embodiments of the instrument 30 including one or more knobs 72 and/or one or more buttons 74, the method of operating the aircraft may include powering up the electronic display instrument module by pressing or turning one of the knobs or buttons.

The instrument 30 may be configured with the ability to start up in a variety of modes, such as a demonstration mode and an operational mode. In one particular embodiment, the instrument 30 starts in a demonstration mode when the instrument is powered on by pressing the knob and holding it down for more than about two seconds to and the instrument starts in the operational mode when the instrument is powered on by only momentarily pressing the knob. The instrument 30 of these embodiments may also include ways for switching modes (e.g., exiting the demonstration mode). As described above, the display screen 46 may display a message corresponding to the mode that the instrument 30 is operating in, such as displaying a "DEMO MODE" message. The method of operating the aircraft also includes viewing the display screen of the electronic display instrument 30 to receive information relating to the aircraft and its use, such as flight (e.g., altitude and speed) or aircraft (e.g., engine and fuel) information. Other examples of information that the electronic display instrument 30 of the present general inventive concept may display are provided above.

When introducing elements of the present general inventive concept or the preferred embodiment(s) thereof, the articles "a", "an", "the", and "said" are intended to mean that there is at least one or that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or illustrated in the accompanying drawings shall be interpreted as illustrative and not in a limiting sense.

What is claimed is:

1. An informational display unit for an aircraft having an instrument panel, the unit comprising:
   a panel having a front side and a rear side;
   at least one display disposed on the front side of the panel to convey information; and
   a first protrusion protruding from the rear side of the panel, the first protrusion having a shape corresponding to a first pre-existing instrument hole in a dashboard of the aircraft, the first protrusion being configured to engage with the first pre-existing instrument hole to position the unit on the dashboard in a first orientation; and
   a battery compartment for housing a power source for powering the display,
   wherein said panel is configured to extend over a second pre-existing instrument hole in the dashboard of the aircraft when the unit is positioned on the dashboard in the first orientation, the first and second pre-existing instrument holes being displaced from each other.

2. The unit as set forth in claim 1, wherein: the battery compartment is located within the first protrusion.

3. The unit as set forth in claim 2, wherein the power source is a backup power source to provide secondary power to the unit.

4. The unit as set forth in claim 1, further comprising:
a second protrusion protruding from the rear side of the panel, the second protrusion being configured to engage with the second pre-existing instrument hole when the unit is positioned on the dashboard in the first orientation.

5. The unit as set forth in claim 4, further comprising:
a cooling component mounted on the rear side of the panel to cool the unit, the cooling component being associated with one of the first and second protrusions,
wherein the battery compartment is associated with the other of the first and second protrusions.

6. The unit as set forth in claim 5, wherein the cooling component is a cooling fan or a plurality of cooling fins.

7. The unit as set forth in claim 4, wherein at least one of the first protrusion or the second protrusion has a generally circular shape corresponding to a pre-existing generally circular hole in the dashboard of the aircraft.

8. The unit as set forth in claim 7, wherein the first protrusion is of a first diameter and the second protrusion is of a second diameter different than the first diameter.

9. The unit as set forth in claim 8, wherein the first protrusion extends from the body a first length and the second protrusion extends from the body a second length that is less than the first length such that the second protrusion has an open space relative to the first protrusion.

10. The unit as set forth in claim 4, wherein the first protrusion is undersized from said first hole, and wherein said second protrusion is smaller in size than said first protrusion.

11. The unit as set forth in claim 4, wherein the second protrusion includes a battery compartment, a battery, or a cooling component.

12. The unit as set forth in claim 1, wherein the at least one display is an active-matrix screen, a liquid crystal display, or a touch-screen display.

13. The unit as set forth in claim 1, further comprising:
one or more displays mounted adjacent to the at least one display.

14. The unit as set forth in claim 1, further comprising:
a plurality of readouts on the display corresponding to readouts of first and second traditional instruments of a traditional six-pack instrument panel, the first and second traditional instruments being associated with respective first and second pre-existing instrument holes.

15. The unit as set forth in claim 1, further comprising:
a plurality of readouts on the display corresponding to information selected from a group consisting of attitude, speed, altitude, navigation, terrain, weather, traffic, lighting, engine, global position, and fuel.

16. The unit as set forth in claim 1 wherein the panel is configured to extend over a third pre-existing instrument hole in the dashboard of the aircraft when the unit is positioned in the first orientation, the third pre-existing instrument hole being displaced from each of the first and second pre-existing instrument holes.

17. The unit as set forth in claim 1, wherein the first protrusion includes three connectors to connect the unit to power and communication lines of the aircraft.

18. The unit as set forth in claim 1, further comprising:
at least one controller positioned on the front side of the panel to control selectively the operation of the at least one display or operations of the aircraft.

19. The unit as set forth in claim 1, wherein the first protrusion is undersized from said first hole.

20. The unit as set forth in claim 1, wherein the first protrusion has a generally circular shape corresponding to a first pre-existing generally circular hole in the dashboard of the aircraft.

21. The unit as set forth in claim 1, wherein the first protrusion houses an electronic element and includes at least two connectors extending from a rear of the first protrusion with respect to the front side of the panel.

22. The unit as set forth in claim 21, wherein at least one of the at least two connectors is a pneumatic connector to connect to a pneumatic line of the aircraft and another of the at least two connectors is an electrical connector to connect to power, ground, and data lines of the aircraft.

23. The unit as set forth in claim 21, further comprising:
a controller to control information displayed on the at least one display corresponding to signals the unit receives through at least one connector of the at least two connectors.

24. An informational display unit for an aircraft having an instrument panel, the unit comprising:
a generally rectangular panel having a front side and a rear side;
at least one display disposed on the front side of the panel to convey information; and
a first protrusion protruding from the rear side of the panel, the first protrusion having a shape corresponding to a first pre-existing instrument hole in a dashboard of the aircraft, the first protrusion being configured to engage with the first pre-existing instrument hole; and
a second protrusion protruding from the rear side of the panel, the second protrusion having a shape corresponding to a second pre-existing instrument hole in a dashboard of the aircraft, the second protrusion being configured to engage with the second pre-existing instrument hole,
wherein said first pre-existing instrument hole is displaced from said second pre-existing instrument hole, and
wherein engaging said first and second protrusions with respective first and second pre-existing instrument holes positions the unit on the dashboard in a first orientation.

25. An informational display unit for an aircraft having an instrument panel, the unit comprising:
a panel having a front side and a rear side;
at least one display disposed on the front side of the panel to convey information; and
a first protrusion protruding from the rear side of the panel, the first protrusion having a shape corresponding to a first pre-existing instrument hole in a dashboard of the aircraft, the first protrusion being configured to engage with the first pre-existing instrument hole to position the unit on the dashboard;
wherein said panel is configured to extend over a second pre-existing instrument hole in the dashboard of the aircraft, the first and second pre-existing instrument holes being displaced from each other, wherein said first and second pre-existing instrument holes are associated with respective first and second traditional instruments of a traditional six-pack instrument panel, wherein said first protrusion is configured to engage with one of the first or second pre-existing instrument holes upon the first and second instruments being removed from respective first and second instrument holes, wherein said unit is configured to display information traditionally associated with the first and second traditional instruments, thereby enabling the unit to physically and functionally replace the first and second traditional instruments when the unit is installed in the aircraft with the first protrusion engaged with the first or second pre-existing instrument holes, and wherein the first and second pre-existing instrument holes are configured so as to be capable of receiving and supporting respective first and second traditional instruments upon the unit being removed from the aircraft, thereby enabling the instrument panel to be reconfigured back into a traditional six-pack configuration.

* * * * *